United States Patent [19]

Ash

[11] Patent Number: 5,407,982
[45] Date of Patent: Apr. 18, 1995

[54] PROCESS FOR PRODUCING STABILIZED POLYKETONE POLYMERS AND POLYMERS PRODUCED THEREFROM

[75] Inventor: Carlton E. Ash, Sugar Land, Tex.

[73] Assignee: Shell Oil Company, Houston, Tex.

[21] Appl. No.: 155,395

[22] Filed: Nov. 19, 1993

[51] Int. Cl.6 ............................ C08K 5/50; C08K 3/16
[52] U.S. Cl. .................................. 524/106; 524/115; 524/122; 524/154; 524/177; 524/401
[58] Field of Search ............... 524/106, 122, 154, 115, 524/401, 177; 523/125, 124; 522/31, 147, 162; 525/340

[56] References Cited

U.S. PATENT DOCUMENTS

| | | | |
|---|---|---|---|
| 2,599,501 | 6/1953 | Upson | 260/63 |
| 3,422,047 | 1/1966 | Cannelongo . | |
| 3,477,986 | 4/1967 | Heinz et al. . | |
| 3,483,260 | 10/1967 | Worrel . | |
| 3,530,164 | 9/1970 | Gillham et al. . | |
| 3,532,667 | 10/1970 | Singh . | |
| 3,547,877 | 12/1970 | Savides . | |
| 3,553,161 | 6/1978 | Heinz et al. . | |
| 3,635,885 | 1/1972 | Starne, Jr. . | |
| 3,642,691 | 2/1972 | Worrel . | |
| 3,674,854 | 7/1972 | Starnes, Jr. . | |
| 3,676,401 | 7/1972 | Henry | 523/124 |
| 3,681,126 | 8/1972 | Maier . | |
| 3,696,078 | 10/1972 | Smith et al. . | |
| 3,770,831 | 11/1973 | Maier . | |
| 3,776,883 | 12/1973 | Stackman | 524/177 |
| 3,968,082 | 7/1976 | Hudgin | 524/288 |
| 4,139,522 | 2/1979 | Lantos | 524/453 |
| 4,452,601 | 6/1984 | Collins et al. . | |
| 4,761,453 | 8/1988 | Allen | 528/392 |
| 4,831,083 | 5/1989 | Geri et al. . | |
| 4,843,144 | 6/1989 | Van Broekhoven et al. | 528/392 |
| 4,880,863 | 11/1989 | Lutz et al. | 524/377 |
| 4,880,865 | 11/1989 | George . | |
| 4,880,903 | 11/1989 | Van Broekhoven et al. | 528/392 |
| 4,912,171 | 3/1990 | Grootaert et al. . | |
| 4,994,511 | 2/1991 | Klutz | 524/99 |
| 5,008,345 | 4/1991 | Wolf . | |
| 5,021,473 | 6/1991 | Macholdt et al. | 524/177 |
| 5,041,329 | 8/1991 | Tojo et al. . | |

FOREIGN PATENT DOCUMENTS

| | | |
|---|---|---|
| 211431 | 2/1987 | European Pat. Off. . |
| 213671 | 3/1987 | European Pat. Off. . |
| 326224 | 8/1989 | European Pat. Off. . |
| 176046A | 12/1978 | Germany . |
| 73-009240-B | of 0000 | Japan . |
| 67-019940-B | of 0000 | Japan . |
| 50-021067 | 3/1975 | Japan . |
| 51-047173-B | 12/1976 | Japan . |
| 52-040553-A | 3/1977 | Japan . |
| 60-152542-A | 8/1985 | Japan . |
| 3121150-A | 5/1991 | Japan . |
| 8501056 | 3/1985 | WIPO . |

Primary Examiner—Veronica P. Hoke

[57] ABSTRACT

It is herein disclosed a process for stabilizing freshly prepared polyketone polymer comprising contacting the polymer with a sufficient quantity of a stabilizing agent such as an alkali metal iodide salt or an onium iodide salt of nitrogen, phosphorus, or arsenic in which the organic groups comprising the cation coordination sphere is shielded by aromatic substituents. The inventive process results in stabilized polyketone polymers having and exhibiting improved thermal oxidative stability properties. It is also disclosed a stabilized polymer composition comprising a major amount of a polyketone polymer and a minor amount of an onium iodide salt of nitrogen, phosphorus, arsenic or combination thereof in which the cation coordination sphere is shielded by aromatic substituents.

19 Claims, No Drawings

PROCESS FOR PRODUCING STABILIZED POLYKETONE POLYMERS AND POLYMERS PRODUCED THEREFROM

FIELD OF THE INVENTION

This invention generally relates to polyketone polymers. More particularly, this invention relates to stabilized polyketone polymers, and to a novel process for producing such stabilized polymers.

BACKGROUND OF THE INVENTION

Polymers of carbon monoxide and olefins generally referred to as polyketones are well known in the art. Of particular interest among polyketone polymers, is the class of linear alternating polymers of carbon monoxide and at least one ethylenically unsaturated hydrocarbon. This class of polymers is disclosed in numerous U.S. patents assigned to Shell Oil Company, exemplified by U.S. Pat. No. 4,880,865 which is herein incorporated by reference.

Although the properties of polyketone polymers are suitable for many applications, linear alternating polymers of carbon monoxide and at least one ethylenically unsaturated hydrocarbon do exhibit a deterioration of physical properties upon thermal oxidative degradation. This degradation is due to a chemical attack of atmospheric oxygen on the polymer chains and is characteristic of most, if not all organic polymers. Oxidation is typically autocatalytic and occurs as a function of heat and oxygen, hence the term thermal oxidative degradation. It is desirable to inhibit the deterioration of polymer properties by stabilizing the polymer toward the adverse effects of heat and oxygen. There are a large number of thermal oxidative stabilizers which are employed commercially to stabilize thermoplastic polymers against such degradation. However, many of the thermal stabilizers which are known to be effective with polyolefins, polyamides, polyacetals, polyacrylates, etc. are only marginally or not at all effective when employed with polyketone polymers. It would therefore be of advantage to provide polyketone polymers which demonstrate improved heat stability to extend their use in higher temperature applications.

SUMMARY OF THE INVENTION

It is a general object of this invention to provide a stabilized polyketone polymer.

It is a further object of this invention to produce an oxidatively stable polyketone polymer.

It is also an object of this invention to provide a process for producing an oxidatively stabilized polyketone polymer.

Accordingly, it is now provided a method for producing an oxidatively stabilized polyketone polymer, comprising contacting freshly produced polyketone polymer with an onium iodide salt of a Group 15 element such as nitrogen, phosphorus, arsenic, or combination thereof in which the cation coordination sphere is shielded by aromatic substituents. It is also provided an oxidatively stabilized blend comprising a major amount of polyketone polymer and a minor amount of an onium iodide salt of a Group 15 element such as nitrogen, phosphorus, arsenic, or combination thereof in which the cation coordination sphere is shielded by aromatic substituents.

The method of contacting the polymer with the iodide salt includes diffusion, melt blending, or by in-situ formation of the iodide salt.

DETAILED DESCRIPTION OF THE INVENTION

The materials useful in practicing this invention include a linear alternating polymer of carbon monoxide and at least one ethylenically unsaturated hydrocarbon (simply referred to as a polyketone polymer), an onium iodide salt of a Group 15 element of the Periodic Table of Elements such as nitrogen, phosphorus, arsenic, or combination thereof (henceforth sometimes referred to as iodide salt), and other common polymer additives. For instance, fillers, extenders, lubricants, pigments, plasticizers, and other polymeric materials can be added to the polyketone compositions being stabilized to improve or otherwise alter the properties of the compositions. In general, the practice of this invention involves suitably contacting sufficient quantities of the useful material to form a stabilized polyketone polymer composition.

The iodide salts (stabilizing agent(s)) of the present invention yield polyketone polymers with improved heat stability when the additive is adequately dispersed in the polymer matrix. Dispersion of the stabilizing agent(s) in the polymer can be accomplished by a variety of methods known to those skilled in the art. Such methods include a) melt compounding after contacting the stabilizing agent with polyketone polymer by powder mixing or solvent deposition, b) diffusion of the stabilizing agent into polymer articles using a solvent which has some miscibility with both polymer and the stabilizing agent, or c) in-situ generation of the stabilizing agent utilizing a polymer blend comprising of precursors which upon application of a sufficient amount of heat generates the stabilizing agent.

Thermal oxidative degradation of organic polymers relates to the deterioration of polymer properties due to the chemical reaction(s) between the polymer and atmospheric oxygen. While oxidation processes are complicated and mechanistic pathways of oxidation between different polymers may vary, oxidation is generally promoted by heat, often initiated by trace impurities such as metal ions or organic prodegradants, and characterized overall as autocatalytic in which carbon radicals and peroxyl radicals constitute key intermediates in the catalytic cycles. Consumption of oxygen by the polymer propagates the catalytic cycle and generates oxygenated species which either comprise part of the polymer or are evolved as gaseous products. These oxygenated species may further be prodegradative to the polymer. For example, hydroperoxides are not inherently stable and are capable of decomposing into new radicals, either thermally or catalyzed by trace impurities, which can then initiate additional oxidative cycles.

For polyketones it is believed that the thermal oxidative process involves the formation of oxygenates which under aging conditions cleave polymer chains and result in a reduction of molecular weight and a loss of polymer entanglement. Ultimately this results in a deterioration of polymer mechanical properties such as reduced impact strength, loss of elongation at break, and embrittlement. It would therefore be advantageous to stabilize the polyketone polymers towards these property losses either by reducing their overall rate of oxidation or reducing their rate of polymer chain scission.

This object is accomplished by adding through conventional methods such as melt blending, or non-conventional methods such as diffusion with a carrier such as water, or by in-situ formation of the stabilizing agent which is selected from the group consisting of onium iodide salts of a Group 15 element such as nitrogen, phosphorus, arsenic, or combination thereof in which the cation coordination sphere is shielded by aromatic substituents. The preferred such oniums are completely coordinated by an aryl substituent or are part of an aromatic ring. The useful iodide salts are exemplified by those listed in Table 1. Because not all iodide salts are useful in the practice of this invention, Table 1 also includes a list of some of the non-useful iodide salts. The contacting of the unstabilized polyketone polymer and the stabilizing agent in the manner previously disclosed results in a stabilized polymer.

unsaturated hydrocarbon. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula $$\mathrm{-[CO-[CH_2-CH_2]_x CO-[G]_y-}$$

TABLE 1

| Stabilizing Iodide Salts | | Non-stabilizing Iodide Salts |
|---|---|---|
| Tetraphenylphosphonium | PPh$_4^+$ | ZnI$_2$ - Zinc iodide |
| Bis(triphenylphosphoranylidene) ammonium | Ph$_3$P=N$^+$=PPh$_3$ | CaI$_2$ - calcium iodide |
| Insitu 4-iodophenyltriphenylphosphonium 1,4-bis(triphenylphosphonium)benzene | 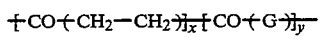 or Ph$_3$P$^+$—⟨◯⟩—$^+$PPh$_3$ | Et$_4$NI - tetraethylammonium iodide |
| | | Me$_4$NI - tetramethylammonium idodide |
| 5-methyl-3-(methylthio-1,4-diphenyl 1H-1,2,4-triazolium | (structure shown) | PPh$_3$MeI - Methyltriphenylphosphonium iodide |
| 9-phenanthryl triphenylphosphonium | | PMe(OPh)$_3$I - Methyltriphenoxyphosphonium iodide |
| | | PPh$_4$Cl - Tetraphenylphosphonium chloride |
| KI (diffusion only)[1] | | PPh$_4$Br - Tetraphenylphosphonium bromide |

[1] Other alkali metal iodide salts such as lithium, potassium, and sodium iodide are also within the scope of the invention.

The polymer of the invention, the inventive stabilizing agents, conventional additives typically useful in the formulation of the inventive composition, and a process for producing the stabilized polyketone polymer of the invention are discussed in more details in various sections of this specification.

The polyketone polymers which are employed as the major component of the oxidatively stabilized polymer composition of the invention are of a linear alternating structure and contain substantially one molecule of carbon monoxide for each molecule of ethylenically where G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the compositions of the invention, there will be no second hydrocarbon present and the copolymers are represented by the above formula wherein y is zero. When y is other than zero, i.e. terpolymers are employed, the —CO—(H$_2$-H$_2$)— units and the —CO—(G)— units are found randomly throughout the polymer chain, and preferred ratios of y:x are from about 0.01 to about 0.1. The precise nature of the end groups does not appear to influence the propoerties of the polymer to any considerable extent so that the polymers are fairly represented by the formula for the polymer chains as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer, and in the case of terpolymers the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketone polymers is illustrated by U.S. Pat. No. 4,834,144 which is herein incorporated by reference.

Broadly speaking, the process of the invention involves dispersing a sufficient amount of stabilizing agent into polyketone polymer to improve the thermal oxidative stability of the polymer. In general, the stabilizers of this invention are employed in an amount within the range of from 0.01 to about 10 percent based on the weight of the polyketone polymer, preferably in the range of from 0.1 to 1.0 percent based on the weight of polyketone polymer. The stabilizer may be incorporated into the polyketone polymer at any stage of its processing, preferably prior to being subjected to elevated temperature, or at such times as desired to improve thermal oxidative stability. The method of incorporating the stabilizer is not considered to be critical so long as the method results in a substantially uniform blend of the composition components. Such methods include a) melt compounding after contacting the stabilizing agent with polyketone polymer by powder mixing or solvent deposition, b) diffusion of the stabilizing agent into polymer articles using a solvent which has some miscibility with both polymer and the stabilizing agent, or c) in-situ generation of the stabilizing agent utilizing a polymer blend comprising of precursors which upon sufficient amount of heat generates the stabilizing agent.

After preparation, the now stabilized polyketone polymers show improved retention of desired mechanical properties, such as resistance to embrittlement when tested under conditions of elevated temperature and air exposure. The test as disclosed in U.S. Pat. No. 4,994,511 subjects polymer samples to aerobic oven aging at various temperatures and monitors the time until brittle failure (cracking) occurs when sharply bent at an angle of 180°.

As will be seen from the examples and data table disclosed herein, freshly prepared polyketone polymers comprising the inventive stabilizing agent and prepared according to the methods of this invention have and exhibit improved stability, particularly improved thermal oxidative stability.

The following examples and tables further illustrate the various aspects of the invention.

EXAMPLES

Polymers used in the following examples are described in Table 2. An oven aging test was used throughout the examples to distinguish the performance of polymer additives. In this test, polymer sheet of 20 or 30 mil thicknesses was prepared either by melt extrusion or compression molding. Test specimens were then cut into 1 cm wide strips and placed into forced air circulating ovens at 100° C. or 125° C. Periodically, the strips were withdrawn from the oven and when cooled bent to a 180-degree angle. When the samples became sufficiently brittle to break under this test procedure it was considered to be a failure and the time to embrittlement was recorded.

TABLE 2

Polyketone polymers used in illustrative examples.

| Polymer | LVN dl/g | Tm °C. | Form | Base Additives[b] |
|---|---|---|---|---|
| A | 1.95 | 220 | Ext. Sheet[a] | 0.5% Irganox 1330 |
|   |      |     |               | 0.5% Nucrel 535 |
| B | 1.86 | 220 | Ext. Sheet[a] | 0.2% Irganox 1330 |
|   |      |     |               | 0.2% CaHAp[c] |
|   |      |     |               | 0.3% Nucrel 535 |
| C | 1.77 | 220 | Powder | 0.2% Irganox 1330 |
|   |      |     |        | 0.2% CaHAp |
|   |      |     |        | 0.3% Nucrel 535 |
| D | 1.73 | 220 | Powder | 0.2% Irganox 1330 |
|   |      |     |        | 0.2% CaHAp |
|   |      |     |        | 0.3% Nucrel 535 |
| E | 1.87 | 220 | Powder | None |

[a]Extruded sheet of 20 mil thickness.
[b]Percent based on weight of polyketone polymer.
[c]Calcium Hydroxyapatite. "IRGANOX 1330" (a trademark of Ciba-Geigy Corp.) is 1,3,5-trimethyl-2,4,6-tris(3,5-di-tert-butyl-4-hydroxybenzyl) benzene, "NUCREL 535" (a trademark of DuPont-Mitsui Polychemicals, Ltd.) is Poly(ethylene-co-methacrylic acid) with 1.0% acrylic acid content

EXAMPLES 1–5

Examples 1–5 demonstrate the utility of iodide additives to heat aging when diffusionally incorporated into polyketone polymer. Test specimens were prepared by immersing polymer A in the form of 20 mil sheet into a water composition for 20–25 min at a temperature of 90°–95° C. The water used was HPLC grade, OmniSolv ® supplied by EM Science. Water compositions used in examples 2–5 included: water alone, 0.30 wt % $ZnI_2$, 2.0% KI, and saturated $Ph_4PI$ which is only sparingly soluble in water at 90°–95° C. After exposure, the polymer specimens were cooled, wiped clean of any surface residue, and dried in a vacuum oven at 50° C. with a nitrogen purge over night. One centimeter wide oven test strips were then cut from the exposed sheets. For the sample which was exposed to $Ph_4PI$, neutron activation tests were conducted to determine the iodide present in the polymer after this exposure. Residual iodine measured ca. 900 ppm, calculating to 0.33% $Ph_4PI$ present in this sample. Results of oven aging tests are shown in Table 3.

TABLE 3

Iodide additives diffusionally incorporated into polyketone polymer.

| | | Days to Failure | |
|---|---|---|---|
| Example | Exposure | 125° C. | 100° C. |
| 1 | — | 20 | 78 |
| 2 | $H_2O$ | 22 | 81 |
| 3 | $H_2O/ZnI_2$ | 21 | 83 |
| 4 | $H_2O/KI$ | 27 | 121 |

TABLE 3-continued

Iodide additives diffusionally incorporated into polyketone polymer.

| Example | Exposure | Days to Failure 125° C. | 100° C. |
|---|---|---|---|
| 5 | H₂O/Ph₄PI | 45 | 234 |

Examples 2 and 3 show that simply exposing the polymer sheet to water alone or to a solution of ZnI₂ does not result in improved heat stability. Exposure to KI and Ph₄PI results in an improvement in heat stability with Ph₄PI being far superior in its ability to stabilize this polyketone polymer—greater than 2 times the control, Example 1.

EXAMPLES 6-10

Test specimens used in Examples 6-10 were diffusionally prepared and then tested as described in Examples 2-5 using polymer A and water compositions which contained 2.0% of the corresponding test additive. The results are summarized in Table 4.

TABLE 4

Onium iodide salt additives diffusionally incorporated into polyketone polymer.

| Example | Exposure | Days to Failure 125° C. | 100° C. |
|---|---|---|---|
| 6 | — | 24 | 108 |
| 7 | H₂O/Ph₄PBr | 21 | 113 |
| 8 | H₂O/Ph₄PCl | 25 | 110 |
| 9 | H₂O/Et₄NI | 26 | 117 |
| 10 | H₂O/Ph₄PI | 44 | 245 |

Examples 7, 8, & 10 show that of the Ph₄P halide salts only the iodide is stabilizing to polyketone polymers. Example 9 demonstrates that alkyl ammonium iodides such as tetraethylammonium iodide (Et₄NI) are not effective in stabilizing polyketone polymers. This demonstrates that not all onium iodide salts are effective as stabilizers for polyketone polymer.

EXAMPLES 11-13

Examples 11-13 were prepared as described in Example 1-5 with the exception that extruded sheet of polymer B was used instead of polymer A. Test specimens for examples 12 & 13 were prepared similar to Examples 7-10. Oven aging results are shown in Table 5.

TABLE 5

Comparison of iodide salts diffusionally added to polyketone polymer.

| Example | Exposure | Days to Failure 125° C. | 100° C. |
|---|---|---|---|
| 11 | — | 18 | 97 |
| 12 | H₂O/CaI₂ | 19 | 96 |
| 13 | H₂O/Ph₄PI | 28 | 128 |

These examples show once again that not all iodide salts are stabilizing to polyketone polymer. Calcium iodide shows no improvement in time to embrittlement over the control.

EXAMPLES 14-16

Examples 14-16 demonstrate that powder mixing of Ph₄PI and polyketone polymer followed by melt processing results in a polymer composition with improved thermal oxidative stability. Examples 15 and 16 were prepared by combining 100 grams polymer C powder with Ph₄PI powder and then homogenizing by tumbling overnight. Each mixture was then extruded on a 15 mm Baker-Perkins twin screw extruder operating at a melt temperature of about 250° C. The extruded compositions were then used to make plaques of 30 mil thicknesses by compression molding. As shown in Table 6, compositions with Ph₄PI showed significantly improved time to embrittlement at 125° C. over the control.

TABLE 6

Aging performance of Ph₄PI melt blended into polyketone polymer.

| Example | Additive | Days to Failure 125° C. |
|---|---|---|
| 14 | — | 8 |
| 15 | 0.25% Ph₄PI | 18 |
| 16 | 0.50% Ph₄PI | 17 |

EXAMPLES 17-26

Examples 17-32 compositions were prepared by melt processing as described in Examples 14-16 with the exception that polymer D was used instead of polymer C. Oven aging test results shown in Table 7, illustrate that onium iodide salts with alkyl substituents (ex. 18-22) exhibit no stabilizing influence on polyketone polymers. Examples 25 and 26 demonstrate the stabilizing influence of iodide salts other than Ph₄PI which also contain onium cations shielded by aromatic substituents, i.e. bis(triphenylphosphoranylidene)ammonium and a triazolium salt, respectively. In these examples, the increased stability was somewhat small, but similar in magnitude to the benefit from Ph₄PI in this polymer, Example 24.

TABLE 7

Aging performance of onium iodide salts melt blended into polyketone polymer.

| Example | Additive | Days to Failure 125° C. | 100° C. |
|---|---|---|---|
| 17 | — | 17 | 73 |
| 18 | 0.43% Ph₃MePI | 16 | 48 |
| 19 | 0.49% (PhO)₃MePI | Not processable | |
| 20 | 0.28% Et₄NI | 12 | 30 |
| 21 | 0.50% Et₄NI | 12 | 32 |
| 22 | 0.22% Me₄NI | 11 | 30 |
| 23 | — | 22 | |
| 24 | 0.3% Ph₄PI | 26 | |
| 25 | 0.43% PPNI[a] | 25 | |
| 26 | 0.25% TI[b] | 27 | |

[a]bis(triphenylphosphoranylidene)ammonium iodide
[b]5-Methyl-3-(methylthio)-1,4-diphenyl-1H-1,2,4-triazolium iodide

EXAMPLES 27-39

Examples 27-39 compositions were prepared by melt processing as described in Examples 14-16 using the polymers and additives identified in Table 8. Example 30 demonstrates the improved resistance to embrittlement using only PPh₄I. Example 31 shows a significant improvement when a commercial hindered phenolic antioxidant such as Irganox 1076 is combined with Ph₄PI in polyketone polymers. This combination results in improved oven aging performance compared to using either individually. Examples 33-39 demonstrate that in-situ formation of phosphonium iodides from a phosphine and an organic iodide components improves the stability of polyketone polymer just as effectively as using Ph₄PI. Examples 34-37 shows that the use of either triphenyl phosphine or 1,4-diiodobenzene alone do not contribute to the stability of polyketone polymers. However, the combination of these additives in Example 33 yields a polymer with significantly improved heat aging performance. Examples 38 and 39, further show the beneficial effect when an organic iodide and triphenylphosphine are combined in the additive package.

TABLE 8

Aging performance of phosphonium iodides melt blended into polyketone polymers and generated in-situ.

| Example | Polymer | Additive | Days to Failure 125° C. |
|---|---|---|---|
| 27 | E | None | 15 |
| 28 | E | 0.5% Irganox 1076 | 19 |
| 29 | E | 0.5% Irganox 245 | 26 |
| 30 | E | 0.3% Ph$_4$PI | 38 |
| 31 | E | 0.5% Irganox 1076, 0.3% Ph$_4$PI | 43 |
| 32 | E | 0.5% Irganox 245, 0.3% Ph$_4$PI | 36 |
| 33 | E | 0.2% PPh$_3$, 0.3% PhI$_2$, 0.5% Irganox 245 | 42 |
| 34 | E | 0.3% PPI$_2$, 0.5% Irganox 245 | 11 |
| 35 | D | — | 18 |
| 36 | D | 0.2% PPh$_3$ | 13 |
| 37 | D | 0.3% PPH$_3$ | 15 |
| 38 | E | 0.5% Irganox 245, 0.3% 9-iodophenanthrene | 26 |
| 39 | E | 0.5% Irganox 245, 0.3% 9-iodophenanthrene, 0.2% PPh$_3$ | 38 |

"IRGANOX 1076" (a trademark of Ciba-Geigy Corp.) is Octodecyl-3,5-di-tert-butyl-4-hydroxyhydrocinnamate, "IRGANOX 245" (a trademark of Ciba-Geigy Corp.) is a Ethylenebis(oxyethylene)bis-(3-tert-buthyl-4-hydroxy-5-methylhydrocinnamate While this invention has been described in detail for the purpose of illustration, it is not to be construed as limited thereby but is intended to cover all changes and modifications within the spirit and scope thereof.

What is claimed is:

1. A stabilized polymer blend comprising a major amount of linear polyketone polymer which is a linear alternating polymer of carbon monoxide and at least one ethylenically unsaturated hydrocarbon and a minor amount of an onium iodide salt of nitrogen, phosphorus, arsenic or combination thereof, in which the organic groups comprising the cation coordination sphere is shielded by aromatic substituents.

2. A blend as in claim 1 wherein said iodide salt is tetraphenylphosphonium iodide.

3. A blend as in claim 1 wherein said iodide salt is 5-methyl-3-(methylthio)-1,4-diphenyl-1-H-1,2,4-triazolium iodide.

4. A blend as in claim 1 wherein said iodide salt is an iodide salt of bis(triphenylphosphoranylidene)ammonium.

5. A blend as in claim 1 wherein said iodide salt is an insitu species of 4-iodophenyltriphenylphosphonium or 1,4-bis(triphenylphosphonium)benzene.

6. A blend as in claim 1 wherein said iodide salt is present in an amount of from 0.01 to 10 wt %.

7. A blend as in claim 1 further comprising a hindered phenol.

8. A blend as in claim 7 wherein said hindered phenol is octadecyl 3,5-di-tert. butyl-4-hydroxyhydrocinnamate.

9. A blend as in claim 7 wherein said hindered phenol is ethylene bis (oxyethylene) bis-(3-tert-butyl-4-hydroxy-5-methylhydrocinnamate).

10. A process for producing a stabilized linear polyketone polymer which is a linear alternating polymer of carbon monoxide and at least one ethylenically unsaturated hydrocarbon comprising contacting said polymer with an onium iodide salt of nitrogen, phosphorus, arsenic or combination thereof, in which the cation coordination sphere is shielded by aromatic substituents.

11. A process as in claim 10 wherein said contacting of said iodide salt is by means of melt compounding.

12. A process as in claim 10 wherein the contacting of the iodide salt with the polymer is by means of in-situ generation of said salt.

13. A process as in claim 10 wherein said iodide salt is present in an amount of from 0.1 to 1 wt %.

14. A process as in claim 10 further comprising the addition of a hindered phenol.

15. A process as in claim 11 wherein said iodide salt is an insitu species of 4-iodophenyltriphenylphosphonium or 1,4-bis(triphenylphosphonium)benzene.

16. A stabilized polymer blend which is a linear alternating polymer of carbon monoxide and at least one ethylenically unsaturated hydrocarbon comprising a major amount of a polyketone polymer and a minor amount of an alkali metal iodide salt.

17. A blend as in claim 16 wherein said alkali metal iodide salt is potassium iodide.

18. A blend as in claim 17 wherein said potassium iodide is present in an amount of from about 0.1 to 1 wt %.

19. A blend as in claim 18 further comprising a hindered phenol.

* * * * *